US011579750B2

(12) United States Patent
Masri et al.

(10) Patent No.: US 11,579,750 B2
(45) Date of Patent: Feb. 14, 2023

(54) METHODS, SYSTEMS, AND APPARATUS, FOR RECEIVING PERSISTENT RESPONSES TO ONLINE SURVEYS

(71) Applicant: Perksy, Inc., New York, NY (US)

(72) Inventors: Nadia Masri, NY, NY (US); Andrew Lin, New York, NY (US)

(73) Assignee: Perksy, Inc., New York, NY (US)

( * ) Notice: Subject to any disclaimer, the term of this patent is extended or adjusted under 35 U.S.C. 154(b) by 0 days.

(21) Appl. No.: 16/715,689

(22) Filed: Dec. 16, 2019

(65) Prior Publication Data

US 2020/0192530 A1 Jun. 18, 2020

Related U.S. Application Data

(60) Provisional application No. 62/779,726, filed on Dec. 14, 2018.

(51) Int. Cl.
*G06F 3/0482* (2013.01)
*G06F 3/01* (2006.01)
(Continued)

(52) U.S. Cl.
CPC ............ *G06F 3/0482* (2013.01); *G06F 3/016* (2013.01); *G06F 3/04842* (2013.01);
(Continued)

(58) Field of Classification Search
CPC .... G06F 3/0482; G06F 3/016; G06F 3/04845; G06F 3/04883; G06F 2203/04806; G06F 3/04842; G06Q 30/0203
(Continued)

(56) References Cited

U.S. PATENT DOCUMENTS 4,720,189 A * 1/1988 Heynen .................. A61B 3/113
351/210
6,160,536 A * 12/2000 Forest ..................... G06F 3/018
345/157
(Continued)

OTHER PUBLICATIONS

Allen, Startup Reflection: A Year in the Books with Gauge and a Lesson from each Quarter. Medium May 11, 2017. Accessed at https://medium.com/@jonallenATL/startup-reflection-a-year-in-the-books-with-gauge-and-a-lesson-from-each-quarter-a1ccba2414f1 on Mar. 27, 2019. 5 pages.

(Continued)

*Primary Examiner* — Kavita Stanley
*Assistant Examiner* — Phoebe X Pan
(74) *Attorney, Agent, or Firm* — Smith Baluch LLP

(57) ABSTRACT

A press and hold function for conducting online surveys with a respondent in order to obtain genuine responses to the online surveys is presented herein. A user interface associated with an online survey is presented to the respondent on a screen of a computing device. The online survey can include a set of questions. Each question of the online survey can include a set of response elements. Each of these response elements can be associated with one or more response duration. In order to select a response to a question, the respondent can press a response button that is associated with one or more response elements to that question. The respondent then holds the response button for the response duration associated with the response element. After the response duration is complete, the response associated with the response element is deemed to be the response of the respondent.

23 Claims, 9 Drawing Sheets

(51) Int. Cl.
  *G06Q 30/02* (2012.01)
  *G06F 3/04842* (2022.01)
  *G06F 3/04883* (2022.01)
  *G06F 3/04845* (2022.01)
  *G06Q 30/0203* (2023.01)

(52) U.S. Cl.
  CPC ...... *G06F 3/04845* (2013.01); *G06F 3/04883* (2013.01); *G06Q 30/0203* (2013.01)

(58) Field of Classification Search
  USPC .................. 715/772, 865, 823, 844, 814
  See application file for complete search history.

(56) References Cited

U.S. PATENT DOCUMENTS

| | | | |
|---|---|---|---|
| 6,513,014 B1* | 1/2003 | Walker | H04N 21/25891 705/1.1 |
| 7,629,966 B2* | 12/2009 | Anson | G06F 3/0488 345/157 |
| 8,635,099 B1* | 1/2014 | Floyd | G06Q 10/10 705/7.32 |
| 8,970,514 B2* | 3/2015 | Gamble | G06F 3/04886 345/173 |
| 9,277,126 B2 | 3/2016 | Marlin et al. | |
| D776,131 S | 1/2017 | Cartlidge | |
| D780,781 S | 3/2017 | Ding et al. | |
| D781,339 S | 3/2017 | Li et al. | |
| D782,526 S | 3/2017 | Rind et al. | |
| D782,527 S | 3/2017 | Rind et al. | |
| D782,529 S | 3/2017 | Dzjind et al. | |
| D783,657 S | 4/2017 | Pitman et al. | |
| D790,583 S | 6/2017 | Kay et al. | |
| D795,913 S | 8/2017 | Bolts et al. | |
| 9,733,739 B1* | 8/2017 | Yates | G06F 3/0412 |
| D802,617 S | 11/2017 | Pitman et al. | |
| D806,107 S | 12/2017 | Kim et al. | |
| D806,108 S | 12/2017 | Day | |
| D806,735 S | 1/2018 | Olsen et al. | |
| D807,375 S | 1/2018 | Manetta et al. | |
| D810,112 S | 2/2018 | Hasjim et al. | |
| D815,126 S | 4/2018 | Iketsuki et al. | |
| D816,102 S | 4/2018 | van Dok et al. | |
| D816,108 S | 4/2018 | Fuller et al. | |
| D816,685 S | 5/2018 | Kendler et al. | |
| D817,976 S | 5/2018 | Shilwant et al. | |
| D818,471 S | 5/2018 | Mohageg et al. | |
| D818,472 S | 5/2018 | Kondo | |
| D819,043 S | 5/2018 | Yamaura et al. | |
| D819,057 S | 5/2018 | Huang | |
| D820,307 S | 6/2018 | Jian et al. | |
| D824,414 S | 7/2018 | Peeters et al. | |
| D824,935 S | 8/2018 | Boutoussov et al. | |
| D826,952 S | 8/2018 | Duriseti et al. | |
| D827,656 S | 9/2018 | Rauschenbach et al. | |
| D829,759 S | 10/2018 | Clapper et al. | |
| D835,142 S | 12/2018 | Li et al. | |
| 10,152,300 B2* | 12/2018 | Brown | G06F 3/167 |
| D842,312 S | 3/2019 | Na et al. | |
| 10,296,128 B1* | 5/2019 | Nold | G06F 3/04883 |
| D853,416 S | 7/2019 | Ryan et al. | |
| 10,376,791 B1* | 8/2019 | Thomas | A63F 9/18 |
| D859,430 S | 9/2019 | Naimark | |
| D861,015 S | 9/2019 | Li et al. | |
| D867,391 S | 11/2019 | Yoshioka | |
| D872,750 S | 1/2020 | Sakuma | |
| D879,809 S | 3/2020 | Harris et al. | |
| D880,496 S | 4/2020 | Farnan et al. | |
| D881,203 S | 4/2020 | Omata | |
| D885,414 S | 5/2020 | Bilancio et al. | |
| D886,851 S | 6/2020 | Shimomura | |
| D887,446 S | 6/2020 | Brinker et al. | |
| D887,447 S | 6/2020 | Brinker et al. | |
| D888,072 S | 6/2020 | Klein et al. | |
| D888,099 S | 6/2020 | Brinker et al. | |
| D890,784 S | 7/2020 | Shelton, IV et al. | |
| D891,459 S | 7/2020 | Suzuki | |
| D892,813 S | 8/2020 | Wan et al. | |
| D892,843 S | 8/2020 | Yakushi | |
| D892,848 S | 8/2020 | McCollum et al. | |
| D896,825 S | 9/2020 | Abel et al. | |
| D896,840 S | 9/2020 | Levy et al. | |
| D897,353 S | 9/2020 | Hall et al. | |
| 10,802,706 B2* | 10/2020 | Viswanath | G06Q 30/0635 |
| D900,834 S | 11/2020 | Yamazaki et al. | |
| D900,846 S | 11/2020 | Baker et al. | |
| D900,863 S | 11/2020 | Clingerman | |
| D901,524 S | 11/2020 | Lee et al. | |
| D901,533 S | 11/2020 | Coffman et al. | |
| D902,948 S | 11/2020 | Fuller et al. | |
| D904,423 S | 12/2020 | Hansen et al. | |
| D905,734 S | 12/2020 | Christiana et al. | |
| D906,355 S | 12/2020 | Messerly et al. | |
| D907,647 S | 1/2021 | Siebel et al. | |
| D907,648 S | 1/2021 | Siebel et al. | |
| D910,673 S | 2/2021 | Krishnamurthy et al. | |
| D910,674 S | 2/2021 | Sastry | |
| D911,356 S | 2/2021 | Varghese et al. | |
| D911,379 S | 2/2021 | Gatlin et al. | |
| D913,329 S | 3/2021 | Mariani et al. | |
| D913,331 S | 3/2021 | Lee et al. | |
| 2002/0002482 A1* | 1/2002 | Thomas | G06Q 30/0203 705/7.32 |
| 2002/0152110 A1* | 10/2002 | Stewart | G06Q 30/02 705/7.32 |
| 2005/0231520 A1* | 10/2005 | Forest | G06F 3/04886 345/581 |
| 2008/0016463 A1* | 1/2008 | Marsden | G06F 3/011 715/814 |
| 2008/0059521 A1* | 3/2008 | Hutson | G06F 16/954 |
| 2008/0288883 A1* | 11/2008 | Pagan | G06F 3/0481 715/764 |
| 2009/0100462 A1* | 4/2009 | Park | H04N 21/4621 725/38 |
| 2010/0127983 A1* | 5/2010 | Irani | G06F 3/03543 345/163 |
| 2010/0171861 A1* | 7/2010 | Ota | H04N 5/23293 348/333.02 |
| 2010/0333011 A1 | 12/2010 | Kornev et al. | |
| 2011/0050653 A1* | 3/2011 | Miyazawa | G06F 3/0488 345/179 |
| 2011/0209058 A1 | 8/2011 | Hinckley et al. | |
| 2011/0227852 A1* | 9/2011 | Gamble | G06F 3/0416 345/173 |
| 2012/0088222 A1* | 4/2012 | Considine | G09B 5/00 434/362 |
| 2012/0303635 A1* | 11/2012 | Summers | G06Q 30/018 707/748 |
| 2013/0093732 A1 | 4/2013 | Esteve et al. | |
| 2014/0071060 A1* | 3/2014 | Santos-Gomez | G06F 3/0488 345/173 |
| 2014/0129990 A1* | 5/2014 | Xin | G06K 9/6201 715/849 |
| 2014/0177396 A1* | 6/2014 | Lee | G06F 3/04886 368/10 |
| 2014/0298260 A1* | 10/2014 | Abowd | G06F 3/04842 715/810 |
| 2014/0349692 A1* | 11/2014 | Zhou | H04M 1/72555 455/466 |
| 2015/0074615 A1* | 3/2015 | Han | H04L 63/083 715/863 |
| 2015/0281573 A1* | 10/2015 | Sasaki | H04N 5/772 348/231.99 |
| 2016/0357281 A1* | 12/2016 | Fleizach | H04N 3/155 |
| 2017/0053299 A1* | 2/2017 | Rozga | G06Q 30/0203 |
| 2017/0063745 A1* | 3/2017 | Banerjee | G06Q 30/0203 |
| 2017/0116870 A1* | 4/2017 | Brem | G09B 5/04 |
| 2017/0178205 A1* | 6/2017 | Brandish | G06Q 30/02 |
| 2017/0188933 A1* | 7/2017 | Huggins | A61B 5/7435 |
| 2018/0164995 A1* | 6/2018 | Czupi | G06F 3/0486 |

(56) References Cited

U.S. PATENT DOCUMENTS

2018/0330629 A1* 11/2018 Raman .................. G06F 16/168
2019/0221019 A1* 7/2019 Itoi ..................... G06F 3/04886

OTHER PUBLICATIONS

Cao, Instagram rolling out new poll-like Emoji Slider feature in Stories. May 10, 2018. 9to5Mac. Accessed at https://9to5mac.com/2018/05/10/instagram-poll-like-emoji-slider-feature/ on Mar. 27, 2019. 7 pages.

Gauge Insights, Inc Application. Accessed at https://www.gaugeinsights.com/ on Mar. 27, 2019. 11 pages.

* cited by examiner

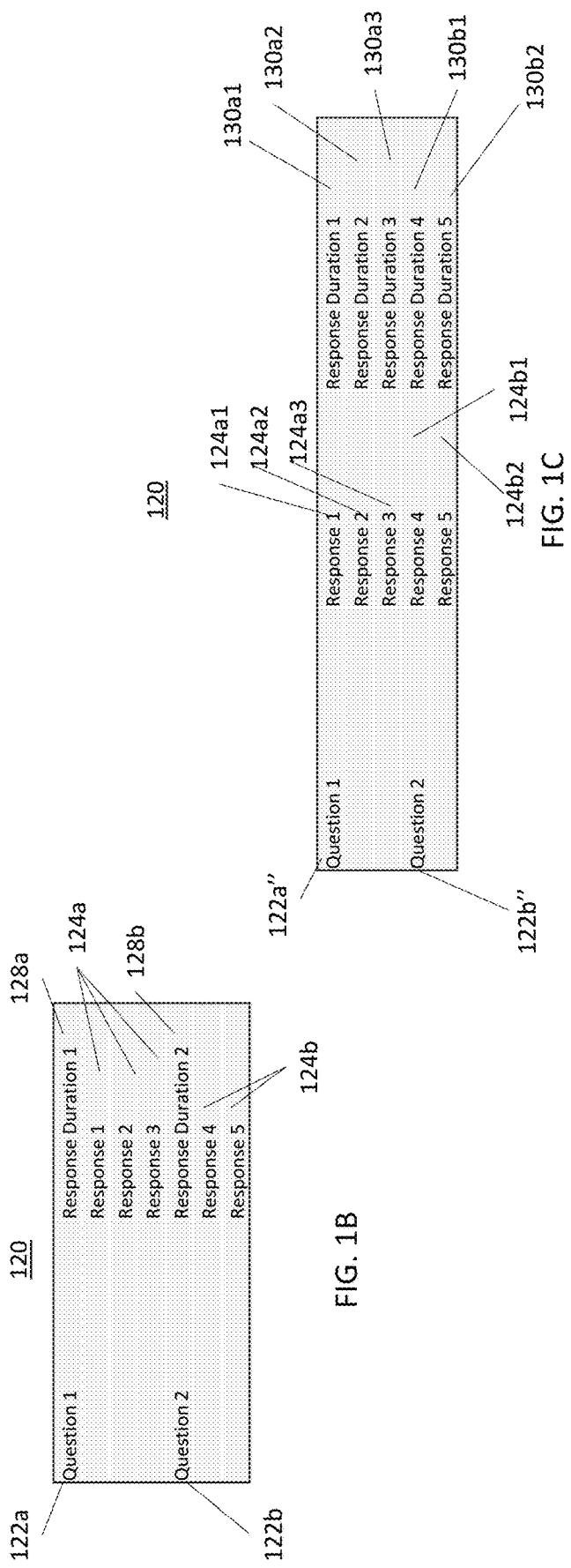

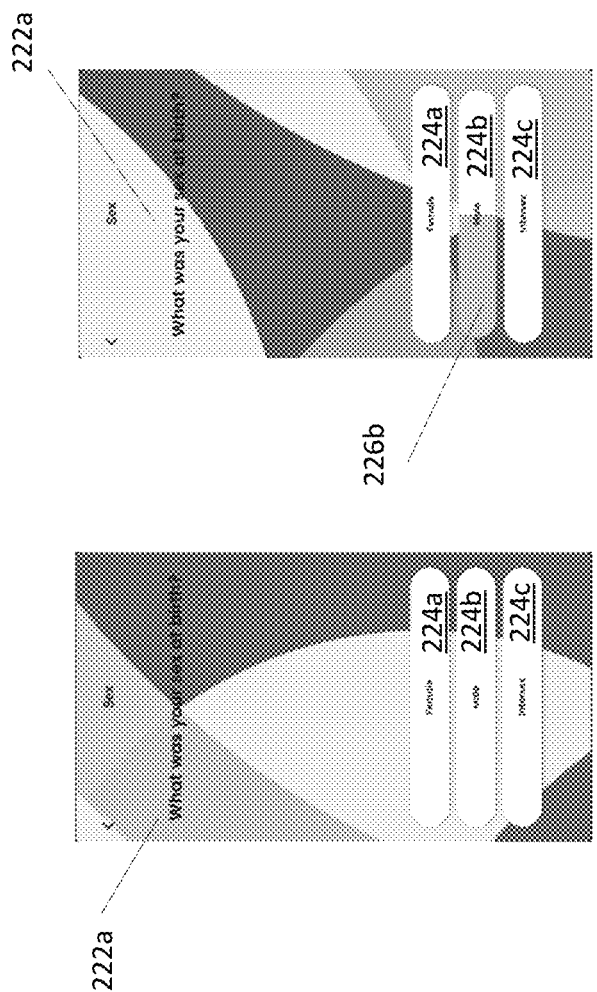

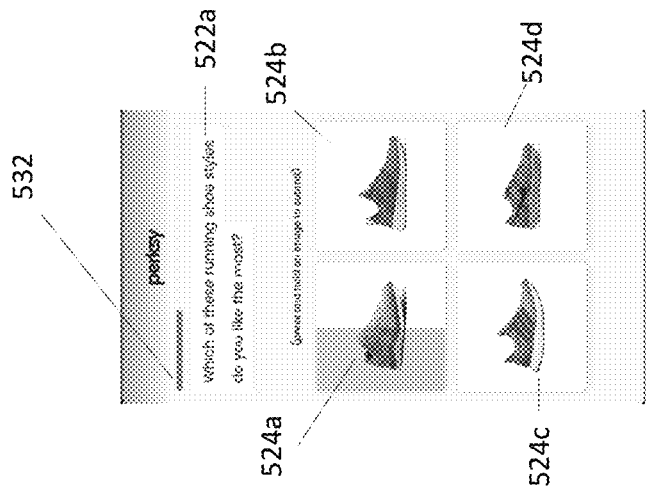
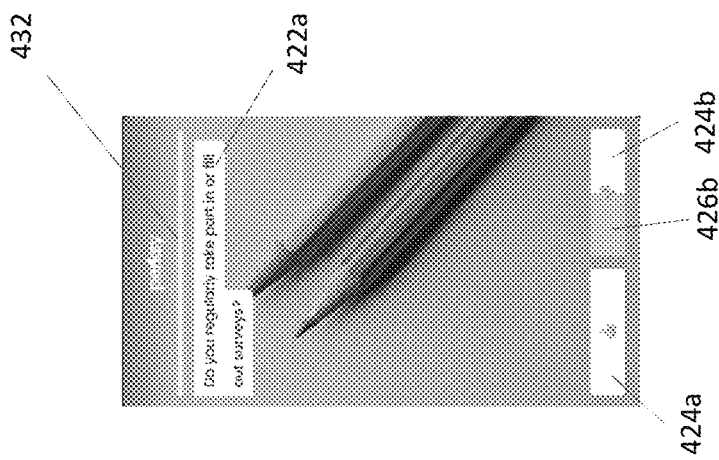
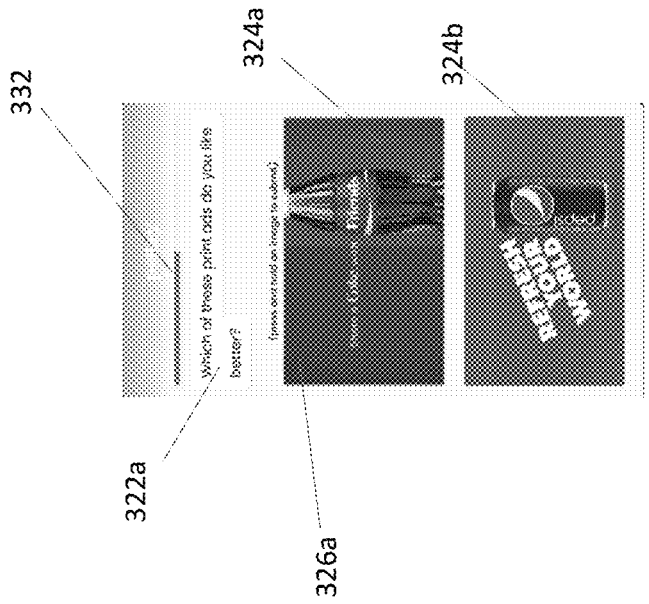
FIG. 3
FIG. 4
FIG. 5

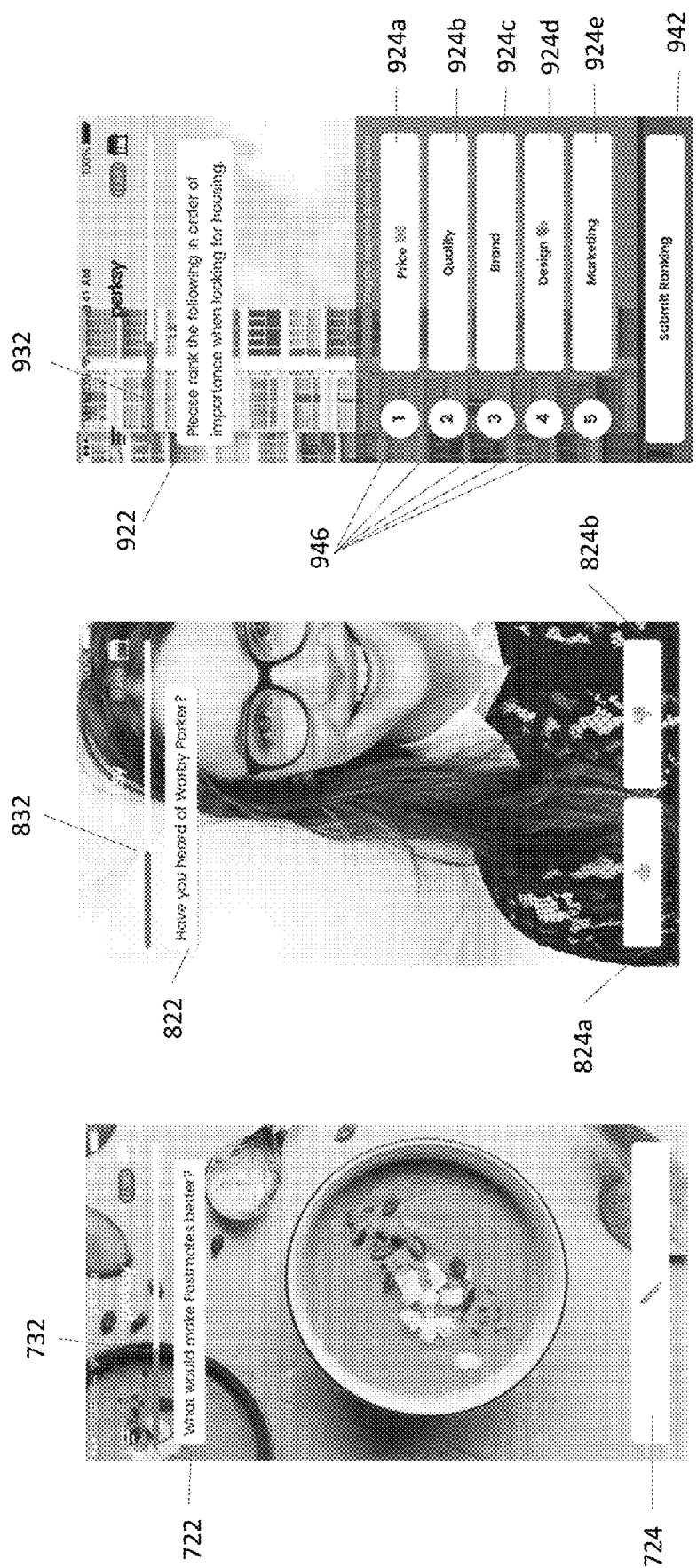

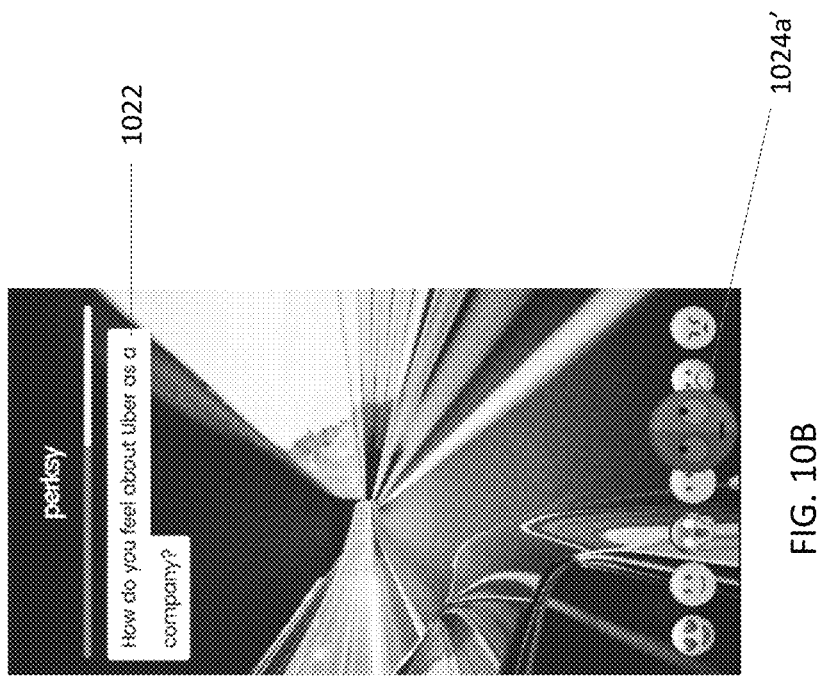
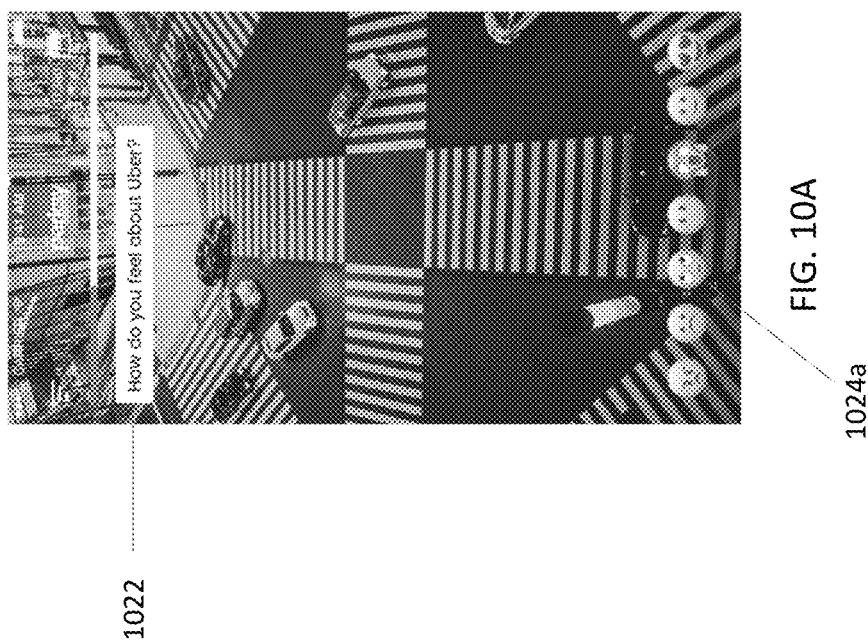
FIG. 10A
FIG. 10B

METHODS, SYSTEMS, AND APPARATUS, FOR RECEIVING PERSISTENT RESPONSES TO ONLINE SURVEYS

CROSS-REFERENCE TO RELATED APPLICATIONS

This application claims the priority benefit, under 35 U.S.C. § 119(e), of U.S. Application No. 62/779,726, entitled "Press and Hold to Submit Function," filed on Dec. 14, 2018, the disclosure of which is incorporated herein by reference in its entirety.

BACKGROUND

The market research industry generates a huge amount of revenue every year and is among the leading industries in the world. Organizations that provide market research services gather and interpret information and provide insights that often shape strategies and marketing/sales activities. In order to gather and interpret information, these organizations use a range of quantitative and qualitative techniques. A widely used quantitative technique includes gathering information using surveys. A survey typically includes a series of questions, with each question have multiple response options. Depending on the survey and/or the question, a respondent can select a single response or multiple responses for a particular question.

Surveys can be in-person surveys that are often conducted by trained interviewers face-to-face with survey respondents. However, in-person surveys have several disadvantages. For instance, in-person surveys often take a long time. In-person surveys also tend to be expensive because they require paying an interviewer who then has to recruit, screen, and interview survey respondents. The logistical coordination and supervision of in-person surveys can be difficult to manage. Furthermore, in-person surveys are prone to human errors.

In contrast, online surveys are more scalable, more efficient, and can have wider and/or more targeted reach than in-person survey. However, a major hurdle with online surveys, including surveys conducted via cloud-based applications running on Smartphones, is the quality of responses to the survey questions. The quality of the responses often determines if the responses can be depended on to shape these strategies and marketing/sales activities. Conventional methods of collecting online survey responses include having respondents type out their responses to ensure that the respondents are reading the questions and providing genuine answers. However, most respondents lack enough interest to type out responses and do not participate since these surveys can be time consuming.

Alternatively, other online surveys have respondents either click to respond immediately to a survey response (i.e., a respondent's click on a response option is immediately recorded as the respondent's response to a survey question); or b) select one or more answers/responses, and then and click a "submit" button. This permits a respondent to tap or click on any response without truly reading the question. Due to the convenience of the tap and click function, a significant number of respondents do not read the questions, or do so cursorily, and select responses based on a quick, sometimes incomplete read. This type of problem arises in the context of online surveys but not in the context of in-person surveys. More specifically, respondents who participate in in-person surveys are interested and willing respondents. Although some people might be reluctant to take the time to participate in an in-person survey and don't agree to participate, those who participate do so purposefully. To participate in an in-person survey, these respondents have to take time and need to be patient. Therefore, the data collected from in-person surveys are often accurate and genuine. In contrast, given the convenience of an online survey, uninterested participants may respond to online surveys to reap benefits that may be associated with being a respondent. Such participants may not take the survey seriously and do not read the questions. Instead, these respondents can tap and/or click on responses quickly. Therefore, the data collected from online surveys can be inaccurate. This can skew the data set of responses. This can compromise the integrity of the data. Non-genuine responses can lead to low-quality answers that skews data and negatively affects the overall data set. This in turn can affect strategies.

SUMMARY

A method for conducting an online survey with a respondent to obtain a persistent selection of a first response element is described herein. The first response element can belong to a set of response elements from the respondent. The method can provide visual feedback to the respondent, while the respondent engages with the first response element, on a status of completion of the selection of the first response element. The method includes presenting an interface associated with the online survey on a screen of a respondent device, the interface displaying, to the respondent, a question of the online survey and the set of response elements, each response element associated with a different response to the question. The method also includes receiving a respondent input from the respondent at the first response element as a selection of the first response element. The method also includes continuously modifying the display of the first response element on the screen to present the visual feedback to the respondent while continuing to receive the respondent input. The method also includes deeming the response associated with the first response element as the respondent's response to the question when the first input is received for a predetermined period.

In some instances, the first response element can be a text box displaying text to the respondent and the continuously modifying the display includes superimposing a progress bar over the text box from a first end of the text box to a second end of the text box over the course of the predetermined duration. In such instances, the progress bar can be translucent to permit the respondent to continue to view the text box.

In some instances, a color of the progress bar can be different from a background color of the text box. In some instances, at least a portion of a boundary of the progress bar overlaps with a boundary of the text box. In some instances, the first response element can be an image and the continuously modifying the display includes superimposing a progress bar over the image from a first end of the image to a second end of the image over the course of the predetermined duration. In some instances, at least a portion of a boundary of the progress bar overlaps with a boundary of the image.

The method can also include enlarging the display of the first response element on the screen of the respondent device upon receiving the respondent input and before presenting the visual feedback.

In some instances, the first response element can be an image and the continuously modifying the display includes displaying a progress bar, such that the image appears superimposed over the progress bar, from outside a first end of the image to outside a second end of the image over the course of the predetermined duration. In some instances, a boundary of the progress bar can be outside a boundary of the image.

In some instances, the first response element can be a video and the continuously modifying the display includes superimposing a progress bar over the video from a first end of the video to a second end of the video over the course of the predetermined duration. In some instances, the progress bar can be translucent or transparent to permit the respondent to continue to view the video.

In some instances, the screen of the respondent device can be a touch screen, the receiving the respondent input includes receiving a touch input at the screen. In some instances, the method also includes presenting audio feedback, or haptic feedback, or both, to the respondent via the respondent device while continuing to receive the respondent input, presenting audio feedback, or haptic feedback, or both.

In some instances, the method can also include receiving, from a remote device, a specification of the predetermined duration.

A non-transitory computer-readable medium (CRM) storing instructions is disclosed herein. The CRM when executed by a processor of a respondent device, perform a method for conducting an online survey with a respondent to obtain a persistent selection of a first response element of a set of response elements from the respondent and to provide sensory feedback to the respondent, while the respondent engages with the first response element, on a status of completion of the selection of the first response element after a predetermined duration. The CRM can store instructions for the processor to: receive, from a remote device, a specification of an online survey including a set of questions, and a set of response elements associated with each question of the set of questions, receive, from the remote device, a specification of the predetermined duration. The CRM can also store instructions for the processor to for each question of the set of questions: generate an interface including that question and its corresponding set of response elements, present the interface associated with the online survey on a screen of the respondent device, the interface displaying, to the respondent, the question and the set of response elements, receive a respondent input from the respondent at the first response element as a selection of the first response element, while continuing to receive the respondent input, present the sensory feedback to the respondent, when the first input is received for the predetermined duration, deem the first response element as a persistent selection by the respondent, and transmit an indication of the first response element to the remote device as the respondent's selection of a response associated with the first response element to the question.

In some instances, the sensory feedback can include visual feedback. The instructions for the processor to present the sensory feedback to the respondent can further include instructions for the processor to present the visual feedback to the respondent by continuously or intermittently modifying the display of the first response element on the screen over the course of the predetermined duration.

In some instances, the sensory feedback can include audio feedback. The instructions for the processor to present the sensory feedback to the respondent can further include instructions for the processor to present the audio feedback to the respondent by one or more of: continuously or intermittently modifying the pitch, or loudness, or both, of an audio signal played by a speaker of the respondent device over the course of the predetermined duration, playing an audio signal upon initial receipt of the respondent input, or playing an audio signal when the first input is received for the predetermined duration.

In some instances, the sensory feedback can include haptic feedback. The instructions for the processor to present the sensory feedback to the respondent can further include instructions for the processor to present the haptic feedback to the respondent by one or more of: continuously or intermittently modifying the frequency, or strength, or both, of a haptic signal generated by an actuator of the respondent device over the course of the predetermined duration, generating a haptic signal upon initial receipt of the respondent input, or generating a haptic signal when the first input is received for the predetermined duration.

In some instances, the predetermined duration can be a first predetermined duration, further storing instructions for the processor to: receive, from the remote device, a specification of a second predetermined duration different from the first predetermined duration. The first response element of the set of response elements can be associated with the first predetermined duration and a second response element of the set of response elements is associated with the second predetermined duration.

In some instances, the instructions for the processor to display the set of response elements further can include instructions for the processor to: display the first response element of the set of response elements at a first size, and display a second response element of the set of response elements at a second size different from the first size. In some instances, the predetermined duration is associated with the first response element and the second response element.

In some instances, the predetermined duration can be a first predetermined duration, further storing instructions for the processor to: receive, from the remote device, a specification of a second predetermined duration different from the first predetermined duration. The first response element can be associated with the first predetermined duration and the second response element can be associated with the second predetermined duration.

A system for conducting an online survey is disclosed herein. The system can obtain a persistent selection of a first response element of a set of response elements from a respondent and provide sensory feedback to the respondent, while the respondent engages with the first response element, on a status of completion of the selection of the first response element after a predetermined duration. The system can include a remote server, the remote server including a memory with a database to: store a specification of a predetermined duration associated with an online survey including a set of questions and a set of response elements associated with each question of the set of questions. The system can also include a computing device communicably coupled to the remote server. The computing device can include a network interface to receive an indication of the predetermined duration from the remote server. The computing device can also include a processor and a display collectively to: execute computer-executable instructions to render the online survey on the display, receive a respondent input from the respondent at the first response element as a selection of the first response element, while continuing to receive the respondent input, present the sensory feedback to the respondent, when the first input is received for the predetermined duration, deem the first response element as a persistent selection by the respondent, and transmit an indication of the first response element to the remote server as the respondent's selection of a response associated with the first response element to the question.

In some instances, the processor is a first processor. The remote server can further include a second processor to: update the database, and update the predetermined duration based on the update to the database. In some instances, the second processor is configured to transmit the updated database to the computing device. In some instances, the first processor and the display are collectively configured to: deem the first response element as a persistent selection by the respondent after the first input is received for the updated predetermined duration.

A method of verifying a respondent's response to a question in an online survey is disclosed herein. The method includes displaying the question to the respondent via a touchscreen of a smartphone. The method also includes displaying a set of response buttons to the respondent via the touchscreen. The response buttons can correspond to respective response options to the question. The method also includes detecting, via the touchscreen, that the respondent is touching a first response button of the response buttons. The method also includes continuously modifying an appearance of the first response button via the touchscreen for a period based on how long it takes to read the question while the respondent touching the first response button. The method also includes in response to the respondent touching the first response button for at least the period, deeming the response associated with the first response button as the respondent's response to the question.

All combinations of the foregoing concepts and additional concepts are discussed in greater detail below (provided such concepts are not mutually inconsistent) and are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1B illustrates example database entries that represent information corresponding to the user survey.

FIG. 1C illustrates example database entries that represent information corresponding to the user survey.

FIG. 2A illustrates an example user interface with a progress bar that is superimposed on a response button that enables receiving persistent response to survey questions.

FIG. 2B illustrates an example user interface with a progress bar that is superimposed on a response button that enables receiving persistent response to survey questions.

FIG. 3 illustrates another example user interface for a function that enables receiving persistent response to a survey question with images for response options.

FIG. 4 illustrates another example user interface for a function that enables receiving persistent response to a survey question with emoticons for response options.

FIG. 5 illustrates another example user interface for a function that enables receiving persistent response to a survey question with images for response options.

FIG. 7 illustrates another example user interface for a function that enables receiving persistent response to a survey question with a response option to type out responses.

FIG. 8 illustrates another example user interface for a function that enables receiving persistent response to a survey question with emoticons for response option.

FIG. 9 illustrates another example user interface for a function that enables receiving persistent response to a survey question with response options that can be ranked.

FIG. 10A illustrates another example user interface for a function that enables receiving persistent response to a survey question with emoticons as response options, including response buttons than can be enlarged upon selection.

FIG. 10B illustrates another example user interface for a function that enables receiving persistent response to a survey question with emoticons as response options including response buttons that can be enlarged upon selection of the response button.

DETAILED DESCRIPTION

Figure 1A:
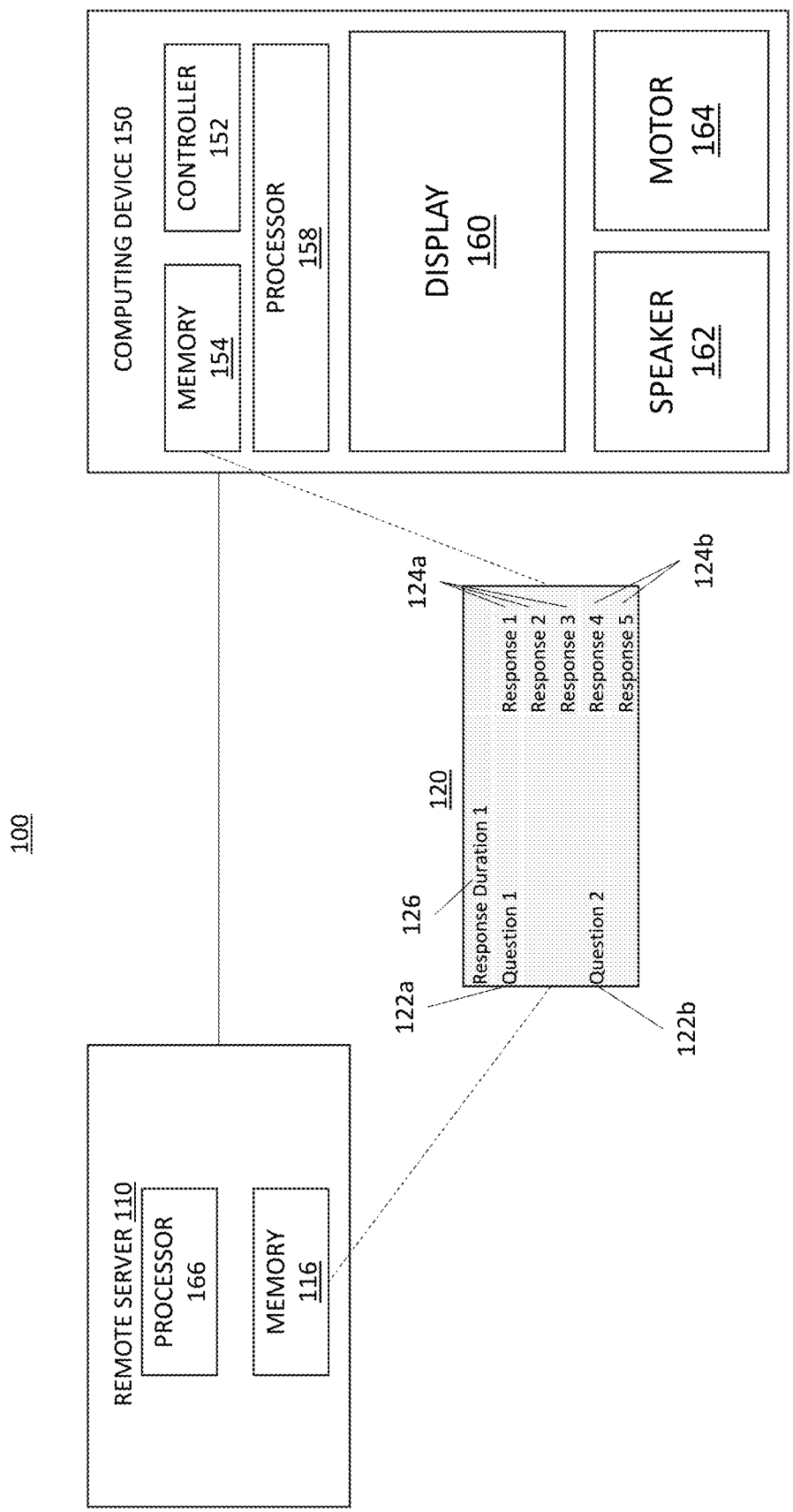
FIG. 1A illustrates an example system for receiving persistent responses to survey questions.

A widely used method to gather information is by user surveys. Today, user surveys are often provided via one or more computing devices. These devices often include a graphical user interface, such as a touchscreen, to present the user surveys to respondents. Existing methodologies for a respondent to respond to user surveys include tapping or clicking on a response button on the graphical user interface in response to a question presented to the respondent on the graphical user interface. However, due to the lack of a sophisticated methodology for submitting survey responses, very often respondents do not tend to read the questions in the user surveys. Moreover, their responses are not well-thought out or accurate. Consequently, the data collected from such user surveys can be inaccurate and misrepresentative, compromising the integrity of the survey data. If such data is relied on, such as for determining where a product should be sold, it can lead to misguided strategies that can result in the product being addressed to the wrong demographic, to the wrong community, and so on.

Therefore, there is a need for a methodology to collect accurate online survey data. Such a methodology would increase the reliability of the collected survey responses, improving the quality of the collected data. As a result, any analysis of such data sets and any subsequent strategies that are formed from analysis of such data sets can be more powerful and more accurate. The press and hold function disclosed here provides precisely these solutions to the technological problem of collecting compromised and skewed data sets with online surveys.

Surveys that are presented to a respondent via one or more computing devices can include the press and hold function. When a survey question is presented to the respondent with multiple response options in the form of video, images, emoticons, and/or the like, in order to choose a response, the respondent is asked to press and hold a response button (also called a selection) for a specific duration of time. This duration of time is provided to the respondent via visual, audio, and/or tactile feedback. The press and hold function is a prolonged, interactive action that provides immediate, real-time feedback to the respondent on the duration of time to hold the response button in order for a response to be selected and/or submitted. Given the interactive nature of the press and hold function and the time duration to hold a response in order to select an appropriate response, a respondent is forced to pay attention to the graphical user interface of the computing device. Therefore, the respondent is more likely to select a genuine response to the survey question. This can lead to more accurate, high-quality survey data.

In some implementations, a survey can be provided to the respondent via a graphical user interface (e.g., a user interface displayed on a display of a smartphone, desktop, laptop, smart TV, etc.). In order to choose a response to a question in the user survey, the respondent can first click or tap (i.e., "press" subfunction in the press and hold function) on a response button (i.e., an action that consequently leads to selecting the response corresponding to the response button as a response to a question in the user survey). Following the click or tap, the respondent can hold (i.e., "hold" subfunction in the press and hold function) the response button for a customizable amount of time. The customizable amount of time can be predetermined. The user's computing device provides sensory feedback, such as visual (e.g., a change, such as change in color or text to a portion of the graphical user interface), tactile (e.g., vibration of the computing device), and/or audible feedback (e.g., ping, music, or any other audible sound) to the respondent to indicate the duration of time to hold the response button in order to successfully submit the selected/chosen response. This feedback can also indicate when the holding of the response button is complete and when the selection of the response is submitted. In this manner, the press and hold function ensures that respondents have to check the portion of the graphical user interface that they are holding, thereby ensuring that the respondents pay attention to their responses, thereby ensuring high-quality responses to user surveys.

Online survey can generally include any suitable digital survey that is presented to a respondent via a computing device (e.g., mobile device, laptops, etc.). These computing devices may initially access a network (e.g., Internet, etc.) in order to access, stream, and/or download the online survey. The computing device may require or desire networked access during the course of the user engaging with the online survey, such as for example when the survey is presented via a web browser, and each successive survey question is downloaded over the network in real-time.

On the other hand, the computing device need not necessarily be coupled to the network for a respondent to fill out and/or otherwise engage with the survey such as when, for example, the survey is downloaded at the beginning of user engagement, or has been previously completely downloaded. A respondent may then response to the survey even when the computing device is not coupled to the network. The responses can be sent to a remote server/an Application Programming Interface/an Application platform once the user completes the survey, and once the computing device accesses, or gains access, to the network again.

Example System to Implement Press and Hold Function

FIG. 1A illustrates an example system 100 for receiving persistent responses to survey questions. System 100 includes a computing device 150 that is associated with a respondent. Some non-limiting examples of computing device 150 include mobile devices and smart phones (e.g., Apple iPhone®, Samsung Galaxy®, Google Pixel®, etc.), computers (e.g., desktops, personal computers, laptops etc.), tablets and e-readers (e.g., Apple iPad®, Samsung Galaxy® Tab, Microsoft Surface®, Amazon Kindle®, etc.), hardware devices that can run application software or allows for internet browsing (e.g., video game consoles, Apple® TV, Amazon Fire Stick®, Roku®, Smart TVs, etc.).

The computing device 150 can include a processor 158 that includes instructions to execute software programs on the computing device 150. These software programs can include application software (e.g., mobile apps, web apps, etc.) that render the user survey on the computing device 150. In some implementations, the software programs can include software to render a web browser (e.g., Google®, Mozilla®, Safari®, Internet Explorer®, etc.), including browser extensions, browser plug-ins, etc. on the computing device 150. The web browser can then render the user survey on the computing device 150.

The computing device can include a memory 154 to store one or more databases (e.g., database 120) on the computing device 150. In some implementations, a database 120 can be stored on a remote server and can be accessed by the computing device 150. In some implementations, some portions of the survey information in the database 120 can be stored in a remote server 110 while other portions of the survey information in the database 120 can be stored on the computing device 150. For instance, questions and corresponding response options can be stored in the database 120 on the computing device 150 while the duration of time for receiving persistent responses can be stored in the database 120 on the remote server 110. In such a situation, the questions and response options can be pulled by the computing device 150 from the database 120 on the computing device 150 itself thus reducing latency and saving bandwidth. By storing the duration of time for receiving persistent responses (referred to herein as "time duration" and/or "response duration") on the remote server, a software engineer can make updates on-the-fly as desired.

Database 120 can include information associated with the user survey. For instance, database 120 can include database entries such as questions 122 (e.g., question 1 122*a*, question 2 122*b*), and corresponding response options 124 (e.g., response options 124*a* to question 122*a*, and response options 124*b* to question 122*b*). In some implementations, database entries can include metadata relating to the user survey, such as a specification of the question, the type of response buttons for the response options, the color and design of the background, etc. The processor 158 accesses database 120 from memory 154 to render the user survey on the computing device 150. The responses from the respondent to the survey can also be stored in the database 120. The database 120 can be a relational database, a distributed database (e.g., Firestore™), and/or the like.

In some implementations, a time duration for the press and hold function can be stored in the database 120. Put differently, the length of the time to press and hold a response button in order to accept the response as genuine can be stored in the database 120. In some implementations, this time duration (also referred to as "response duration") can be the same for every question in the user survey. The time duration can be stored as a separate row such as response duration 126 in FIG. 1A. In other implementations, this time duration can be different for different questions in the user survey. The time duration can also be stored as a separate column (not shown in FIG. 1A) in database 120. This separate column can include the time duration for every question (i.e., can be same or different for every question). Put differently, the time duration can be on a per survey, a per question, or a per response basis. Moreover, the time duration can be stored at the same location (i.e., database 120) as that of the associated user survey, questions, and response elements. FIG. 1B and FIG. 1C below explains this concept in greater detail with examples.

In some implementations, the time duration can be static or predetermined. Once the time duration is predetermined and saved in the database 120 it cannot be changed. For instance, the time duration 126 in FIG. 1A can be assigned to the user survey before rendering the user survey on the display 160 (i.e., before the application software/software instructions to render the user survey on a web browser are sent to computing device 150) and can be stored in the database 120. This time duration 126 can be static (i.e., once assigned the time duration 126 cannot be changed). In some implementations, the time duration can be updated after it is initially assigned. Put differently, instead of the time duration 126 being static, the time duration 126 can be changed at any point. For example, a previous respondent may already know and be accustomed to the time duration 126 provided such a respondent has taken a similar user survey before. These respondents can be provided with an updated time duration 126 to ensure that these respondents continue to pay attention to the questions and provide genuine answers. In some implementations, the dynamic time duration may be changed by the processor 158. In other implementations, the time duration may be changed by a remote server 110. In another implementation, the time duration can be changed via a display 160.

In some instances, the time duration can be 1.20 seconds. The time duration can be less than about 0.3 seconds, from between about 0.3 seconds to about a minute, and greater than a minute, including all values and sub-ranges in between. In some instances, the time duration can be about 1.20 seconds. In this manner, the time duration can be selected to balance the desire for a persistent response from the user without losing the user's interest in the survey due to prolonged hold times The database 120 shown in FIG. 1A is merely for illustrative purposes. The database 120 can be any form of database and can include any structure. For instance, the database 120 can be stored as a JSON structure in a key-value data format. Put differently, the time duration can be stored as a value in the key-value data format with a key.

The user survey can be rendered on the display 160 of the computing device 150. In some implementations, the display 160 can be a touchscreen. In other implementation, the display 160 can be a screen that is coupled to a controller (e.g., Xbox controller, mouse, keyboard, etc.) that can control one of more cursors on display 160. When the user survey is rendered on the display 160, every question includes one or more responses for the respondent to select as an answer to that question. Each question is associated with a time duration or a response duration (e.g., time duration 126 stored in database 120). In order to select a response to a question, the respondent has to press and hold the response on the display 160 for the time duration that is associated with that question. The response can be displayed in the form of a response button. A response button is a widget that can be designed for the respondent to interact with. When the response button is initially pressed or clicked (e.g., via a touchscreen or a controller), the press subfunction begins. A respondent can hold the response button for the time duration in order to select the response. A response button can display responses in the form of a text, image (e.g., including emojis or emoticons), video, etc. In some instances, the response button can be a standalone response button (i.e., the response button takes the form of a circle, rectangle, text boxes, etc.). In other instances, the response button can be placed within a shape (e.g., circles, rectangles, text boxes, etc.). In summary, the response button can include the press and hold functionality.

As the respondent presses and holds the response button (i.e., the press and hold function), the respondent is given feedback on the time elapsed and/or the time left to hold the response in order for the response to be selected and saved.

This feedback can be in the form of a visual feedback shown on the display 160. The visual feedback can be in the form of a time counter on the display 160, such as an analog clock dial, a digital clock, etc. The time counter can display the time that is elapsed and the press and hold time (e.g., in milliseconds).

In some implementations, this visual feedback can be a progress bar. For instance, the visual feedback can be a progress bar on any part of the display 160, that progresses from the left to right, top to bottom, etc. Put differently, the progress bar may start on the left side of the display 160 when the respondent presses the response button. Once the progress bar reaches the right side of the display 160 as the respondent continues to hold the response button, the response is considered selected by the respondent, and saved in the database 120. Similarly, the progress bar can progress from the right to the left. In some implementations, the length of the progress bar can depend on the time duration for the question.

The progress bar can be included in the response button itself. Put differently, the response button can be superimposed with a progress bar that starts when the respondent presses the response button. As the respondent continues to hold the response button, the progress bar within the response button moves from one end to another. FIGS. 2A-5 illustrate this concept in greater detail. The response is selected and saved when the respondent holds the response button until the progress bar reaches its end, i.e., at the end of the response duration. The progress bar is translucent to provide the respondent with a view of the response button. The color of the progress bar can be different than the color of the response button. The progress bar can shade the color of the response button to be a darker shade. In some implementations, the boundary of the progress bar can overlap with the boundary of the response button (e.g., FIG. 2B).

The visual feedback is presented to the respondent by modifying a part of the display 160. For instance, superimposing a progress bar on a response button such that the progress bar extends from one end to another modifies the display 160, especially if the progress bar is translucent and the underlying response element is visible to the respondent.

In some implementations, the time duration to select a response can be changed via the display 160 by the respondent. For instance, the application software and/or web browser that renders the user survey can include a functionality for the respondent to change the time duration to select a response. This change can be made via the display 160 and can be transmitted to the database 120.

The computing device 150 can include a speaker 162 to provide audio feedback to the respondent regarding the user survey. Put differently, the time duration for a response to be selected and saved can be conveyed to the respondent via the speaker 162. For instance, when a respondent presses a response button an initial sound (e.g., a ping, an audio instruction, a sound, music, etc.) can be transmitted via the speaker 162. This initial sound can indicate that the response button has been pressed. As the respondent continues to hold the response button, after the time duration for the response has elapsed, a second sound can be transmitted via the speaker 162. The second sound can indicate the completion of hold function and the fact that the response has been selected and saved. In some instances, when a respondent presses a response button, the speaker 162 can start transmitting a sound. This sound continues until after the time duration for the response has been elapsed. The end of the sound indicates the completion of the hold subfunction and the fact that the response has been selected and saved. These sounds can be any sound, or noise, or music. The sound can be a single continuous sound, or a discontinuous sound, such as a series of clicks. Generally, the sound can have any suitable waveform shape (e.g., one or more combinations of sine wave, square wave, triangle wave, sawtooth wave, etc.) having a time-dependent amplitude and/or frequency. In some instances, a respondent can choose the sound that can be programmed to play when the respondent performs the press and hold function in the user survey.

The computing device 150 can include a motor 164 to provide tactile feedback to the respondent regarding the survey. Put differently, the time duration for a response to be selected and saved can be notified to the respondent via the motor 164 of the computing device 150. For instance, the motor 164 can be a small electric motor on the axis of which a metal cylinder can be mounted. The axis of the electric motor does not coincide with the axis of the cylinder. When a respondent presses a response button, the motor 164 starts to spin and rapidly unwinds the cylinder causing the computing device 150 to vibrate indicating that the response button has been pressed.

As the respondent continues to hold the response button, after the time duration for the response has elapsed, the motor 164 causes the computing device 150 to vibrate another time indicating that the response has been selected or saved. In some instances, when a respondent presses a response button, the motor 164 causes the computing device 150 to vibrate. This vibration continues until after the time duration for the response has elapsed. The end of the vibration indicates the completion of the hold subfunction and the fact that the response has been selected and saved.

In some implementations, the computing device 150 can provide a combination of visual, audio, and tactile feedback for a given user survey. For instance, the computing device 150 can provide a visual feedback to a first question, an audio feedback for a second question, and a tactile feedback for a third question. In one instance, the computing device 150 can provide a combination of two or even all of the three feedback mechanisms (i.e., visual feedback and tactile feedback, or audio feedback and tactile feedback) for every question. In some instances, this combination can be different for different questions in a given user survey.

The computing device 150 can include a controller 152 that enables the interactive action of press and hold function in user surveys. Put differently, the controller 152 allows the respondent to interact with the user survey by pressing and holding responses. In some implementations, the controller 152 can be integrated with the computing device 150 (as shown in FIG. 1A). In some implementations, the controller 152 can be communicably coupled to the computing device 152 (not illustrated in FIG. 1A). The controller 152 can allow the respondent to select responses in the user survey. For instance, if the computing device 150 is a smart phone, the controller 152 allows the respondent to tap a response button on the display 160 and hold the response button. If the computing device is an Xbox, the controller 152 allows the respondent to press a button on an Xbox controller 152 that translates to highlighting a response on the display 160. The respondent can then continue to hold the button on the Xbox controller 152 for the response duration of that question in order to select the response. If the computing device 150 is a desktop computer, the controller 152 can be a mouse. The respondent can use the mouse cursor to press a response on the display 160 and hold the response in order for it to be selected and saved.

The computing device 150 can be communicably coupled to a remote server 110. The remote server 110 can include the application software that renders the user survey. The application software can be transmitted to the computing device 150 so that the processor 158 of the computing device 150 can render the user survey on the display 160. In some implementations, the remote server 110 can include software instructions to render the user survey on a web browser. These software instructions can be transmitted to the processor 158 of the computing device 150 that renders the user survey on a web browser that can be shown on the display 160.

The response duration and/or time duration for questions to the survey can be changed/updated directly on the application software and/or the software instructions that render the user survey. Put differently, the response duration can be changed directly in the code of the application software/software instructions. These changes are transmitted to the computing device 150, e.g., as a version update to the application software or as an update to the software instructions. The processor 158 can process these updates and display the user survey via display 160 with the updated time duration. In other words, instead of changing the response duration in the database 120, the time duration can be changed on the computing device (e.g., on the software itself).

The remote server 110 can include a memory 116 to store the database 120. As discussed above, the database 120 includes information associated with the user survey. That is, the database 120 includes questions, corresponding response options, and time duration for every question. When the application software/software instructions are transmitted to the computing device 150, the database 120 can also be transmitted to the computing device 150 which is then subsequently stored in the memory 154 of the computing device 150. When the respondent responds to the questions, the responses are updated in the database 120 in the memory 154 of the computing device 150. These updates are transmitted back to the remote server 110 and the database 120 is updated in the memory 116 of the remote server 110 as well. Put differently, any update to the database 120 either on the remote server 110 or on the computing device 150 can be transmitted to the other device thereby ensuring that the database 120 is consistent between both the remote server 110 and the computing device 150. That is, redundant copies of database 120 can be maintained between the remote server and the computing device (e.g., database mirroring).

The remote server 110 can also include a processor 166. Application software and/or software instructions to render the user survey on a web browser or an application can be transmitted from processor 166 to the computing device 150. In some implementations, updates to the application software and/or software instructions can be executed by the processor 166. In some implementations, updates or changes to the database 120 can be made by the processor 166. These updates or changes can be stored in the database 120 in the memory 154 of the remote server 110. These updates can also be transmitted to the computing device 150 so that the changes to the database 120 by the processor 166 can be reflected in the computing device's 150 copy of the database 120.

In one implementation, as discussed above, the time duration for each question of the user survey can be assigned and/or updated on the computing device itself. Put differently, the time duration for each question of the user survey can be assigned and/or updated as code in the application software/software instructions that renders the user survey. This time duration when initially assigned is a part of the initial application software/software instructions that can be then transmitted from the remote server 110 to the computing device 150. Any further updates to the time duration can be transmitted to the computing device 150 in the form of an update to the application software/software instructions that render the user survey.

When the user survey is displayed on display 160 of the computing device 150, the respondent can see one or more questions and corresponding response choices to the questions. The feedback (i.e., visual feedback, audio feedback and/or tactile feedback) is assigned based on the time duration. When a respondent presses a response button, the respondent has to hold that response button for the time duration until a feedback is presented to the respondent indicating that the respondent's response has been selected and saved. The duration for which the respondent should hold the response button is based on the time duration in the code of the application software/software instructions and is conveyed to the respondent via the visual feedback, audio feedback and/or tactile feedback. Once a respondent's response has been selected and saved, the display 160 displays a subsequent question that follows the same process. The process continues for all questions until the user survey comes to an end and all the responses have been selected and saved.

In another implementation, the time duration to each question in a user survey can be assigned in the database 120. The database 120 can include one or more tables to manage information related to the user survey. In some implementations, the database 120 can include text, images, videos, response types, etc. in the database 120.

When a user survey is rendered on the display 160 of the computing device 150, the display 160 can pull a question and the corresponding response options from the database 120. The press and hold function for the question can be based on the time duration for the corresponding question in the database 120. The feedback (i.e., visual feedback, audio feedback and/or tactile feedback) is assigned based on this time duration. Any change to the time duration within the database 120 in the computing device 150 is transmitted to the database 120 in the remote server 110. Similarly, any change to the time duration within the database 120 in the remote server 110 is transmitted to the database 120 in the computing device 150.

When a respondent presses a response button, the respondent has to hold that response button for the time duration until a feedback is presented to the respondent indicating that the respondent's response has been selected and saved. This process continues for all questions until the user survey comes to an end and all the responses have been selected and saved.

As discussed above, the time duration can be customizable and predetermined. This time duration can be set on the computing device 150 (i.e., it can be assigned or updated in the application software/software instructions that renders the user survey). In other instances, the time duration can be set in a memory, such as memory 116 and/or memory 154 that the application software/software instructions can read from (i.e., stored as a value in a database).

Example Databases

FIG. 1B and FIG. 1C illustrate example databases 120 to store information corresponding to the user survey. The database 120 shown in FIG. 1A, FIG. 1B, and FIG. 1C are for illustrative purposes only. The database 120 can be of any structure and any form.

In FIG. 1B, the database 120 includes a question, a corresponding time duration for responses to that question, and corresponding response options. For instance, question 122*a* has three response options (collectively shown as 124*a*). The time duration for each of those response options is the same (i.e., response duration 128*a*). Question 122*b* has two response options (collectively shown as 124*b*). The time duration for each of these two response options is response duration 128*b*.

When question 122*a* is displayed to a respondent, the respondent can press a response button that corresponds to any one of the three response options 124*a*. In order for the response to be selected and saved for question 122*a*, the respondent will have to hold the response button for a time duration of 128*a*. Put differently, no matter which of the three responses the respondent would like to choose, the corresponding response button will have to be held for a time duration of 128*a* in order for that response to be selected and saved.

Similarly, when question 122*b* is displayed to the respondent, the respondent can press a response button that corresponds to any of the two response options 124*b*. In order for the response to be selected and saved for question 122*b*, the respondent will have to hold the response button for a time duration of 128*b*.

In FIG. 1C, the database 120 includes a question, corresponding response options to that question, and a time duration for each response option to that question. For instance, question 122*a''* has three response options 124*a*1, 124*a*2, and 124*a*3. Each of these response options has a corresponding response duration. For example, response option 124*a*1 has response duration 130*a*1, response option 124*a*2 has response duration 130*a*2, and response option 124*a*3 has response duration 130*a*3. These three response durations (i.e., response durations 130*a*1, 130*a*2, 130*a*3), can be same or different. Similarly, question 122*b*" has two response options 124*b*1 and 124*b*2. Response option 124*b*1 has a response duration 130*b*1 and response option 124*b*2 has a response duration 130*b*2.

When question 122*a*" is displayed to a respondent. If the respondent wants to choose response option 124*a*1, the respondent will have to press the response button corresponding to 124*a*1 on the display. The respondent will then have to hold the response button for a time duration of 130*a*1 in order for the response to be selected and saved. However, if the respondent wishes to choose response option 124*a*2, the respondent will have to press the response button corresponding to 124*a*2 on the display. The respondent will then have to hold the response button for a time duration of 130*a*2 in order for the response to be selected and saved. In order for response option 124*a*3 to be selected and saved, the respondent will have to press the corresponding response button on the display and hold it for a time duration of 130*a*3.

Therefore, as seen in FIG. 1B and FIG. 1C, the response duration can be different for different questions. Moreover, for each question, the response duration can be different for different response options. For instance, if the response options to a question are combinations of emoticons and text. Each response option can have a different response duration. For example, an emoticon can be read quickly and therefore a response option with an emoticon can have a small response duration. However, if a response option is a sentence that takes time for a respondent to read, that response option can have a longer response duration associated with it.

Example User Interfaces for Surveys with Press and Hold Function

FIGS. 2A and 2B illustrate example user interfaces that implement the function for receiving persistent responses to survey questions. The respondent is presented with a question 222*a*. The respondent can respond by selecting one of the three response options 224*a*, 224*b*, or 224*c*. Each of the response options are displayed as a response button that includes the response options in the form of text. In this example, the response buttons are superimposed with a progress bar that provides the respondent with visual feedback. This visual feedback indicates the time lapsed as the respondent holds a response option and the time remaining in order to select and save the response option as a genuine response.

In this example, as shown in FIG. 2B, the respondent chooses the response option 224*b*. In order to select and record this response as genuine, the respondent first presses and then holds the response button 224*b*. As the respondent continues to hold the response option 224*b*, the progress bar superimposed in the response button starts to move (extend) from the left to the right, providing visual feedback to the respondent. In FIG. 2C, the progress bar 226*b* has progressed midway. In one instance, this can indicate that the respondent has pressed the response option 224*b* for approximately half the response duration of the response option 224*b*. The respondent has to continue to hold the response option 224*b* for approximately the same amount of time as until this point in order for response option 224*b* to be selected and saved. In another instance, the progress bar 226*b* can move faster at the beginning of the response duration and slower at the end of the response duration. In such a case, the respondent will have to continue to hold the response option 224*b* for greater time as until this point in order for the response option 224*b* to be selected and saved. In another instance, the progress bar 226*b* can move slower at the beginning of the response duration and faster at the end of the response duration.

FIGS. 3-5 illustrate more example user interfaces that implement functions for receiving persistent responses to survey questions.

In FIG. 3, the respondent is presented with a question 322*a*. The question has two response options 324*a* and 324*b*. These response options 324*a*, 324*b* are presented as response buttons that include the response options in the form of images. In this example, the response buttons are superimposed with a progress bar that provides the respondent with visual feedback indicating the response duration (e.g., progress bar 326*a* in FIG. 3). The progress of the survey itself is also indicated with another progress bar 332. In FIG. 3, the progress bar 332 indicates that the respondent is half-way through the user survey.

In FIG. 4, the response options to question 422*a* are presented as response buttons that include the response options in the form of emoticons. In FIG. 5, the response options to question 522*a* are presented as response buttons that include the response options in the form of images. In this example, the respondent presses and holds the first response option 524*a* of the four response options. The response button corresponding to response option 524*a* is superimposed with a progress bar that indicates the response duration that has elapsed.

Figure 6:
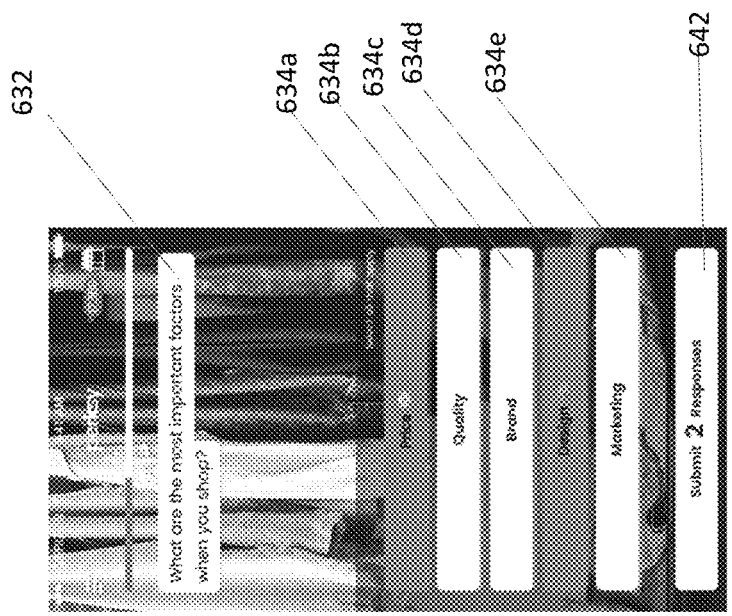
FIG. 6 illustrates another example user interface for a function that enables receiving persistent response to a survey question with more than one response option as a response to the survey question.

FIG. 6 illustrates another example user interface that implements the function for receiving persistent responses to survey questions, in accordance with some implementations. In FIG. 6, question 632 has five response options 634*a*-634*e*. In this example, the respondent can choose more than one response as a response to question 632. In this case, the respondent chooses response options 634*a* and 634*d*. The respondent will have to press and hold each of response buttons associated with the two response options 634*a* and 634*d* for a specific response duration. Once the progress bar superimposed with the response buttons moves from the left of the response button to the right (as seen in FIG. 6), these responses are considered to be selected. In order to submit the response to the survey (i.e., response options 634*a* and 634*d* as response to question 632), the respondent will have to press and hold the response button 642. The time duration to hold the response button 642 can be the same as the time duration to hold response options 634*a* and 634*d* or can be a different time duration.

FIGS. 7-9 illustrate example user interfaces that implement the function for receiving persistent response to survey questions as explained with respect to FIG. 1A, in accordance with some implementations. In FIG. 7, the user interface includes a question 722. In order to respond to this question, the respondent will have to press and hold the response button associated with the response 724 for a specific response duration. After the lapse of the response duration, a separate box (not shown in FIG. 7) can be generated. The separate box can be a text box via which the respondent can type (e.g., using a touchscreen or a keyboard) a response to question 722. Progress bar 732 indicates the progress of the user survey (i.e., number of questions that are completed vs. number of questions that are remaining).

In FIG. 8, question 822 has two response options 824*a* and 824*b* in the form of emoticons. The respondent will have to press and hold the response button associated with either response option 842a or response option 824b for the response duration in order to select and save the response to question 822.

In FIG. 9, question 922 has five response options 924a-924e. Each of these response options are to be ranked by the respondent. The respondent can drag and drop the response button associated with each response option to the rank that the respondent chooses. For instance, in this example, the respondent has dragged the response button associated with response option 924a to rank 1. Once the respondent has ranked all the response options, the respondent can press and hold the response button 942 in order to select and save the ranking.

FIGS. 10A and 10B illustrate an example user interface that implement the function for receiving persistent response to survey questions, in accordance with some implementations. In FIGS. 10A and 10B, the question 1022 has response options in the form of emoticons. In this example, the respondent decides to choose response option 1024a. The respondent can press the response button associated with response option 1024a. As shown in FIG. 10B, the response button associated with this response option is slightly enlarged and pushed to the front (see 1024a'). A progress bar superimposed on the response button indicates the response duration that has elapsed.

Figure 12:
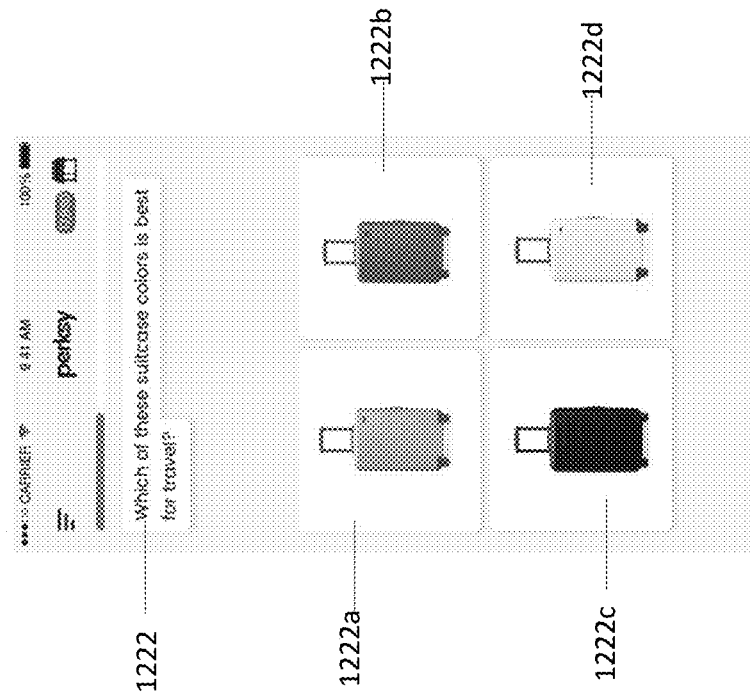
FIG. 12 illustrates another example user interface for a function that enables receiving persistent response to a survey question with images for response option.
Figure 11:
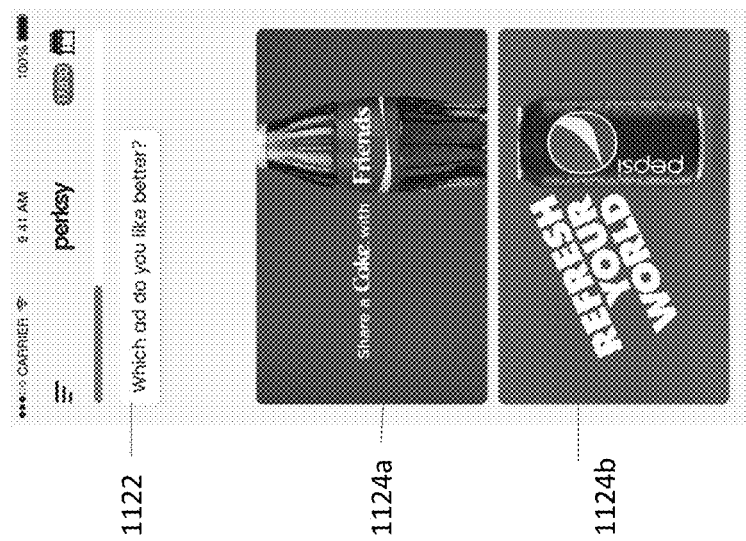
FIG. 11 illustrates another example user interface for a function that enables receiving persistent response to a survey question with images for response options.

FIGS. 11 and 12 illustrate example user interfaces that implement the function for receiving persistent response to survey questions, in accordance with some implementations. In these examples, the response options are in the form of images. In order to choose a response, the respondent has to press and hold the response button associated with that particular response.

Figure 13C:
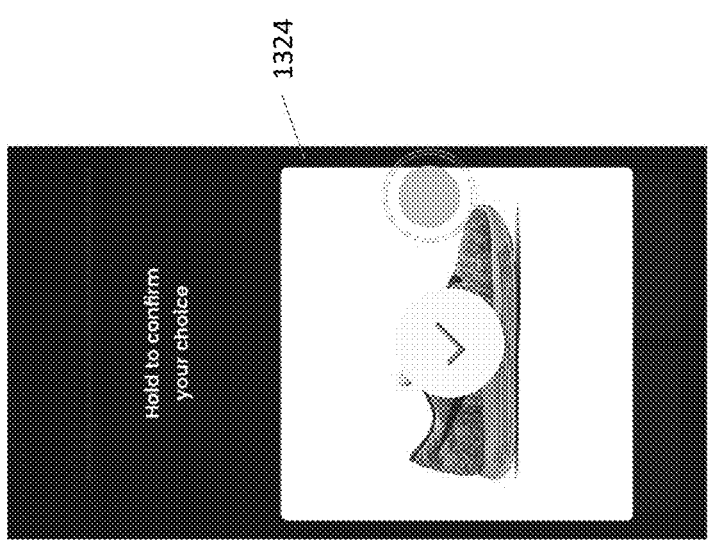
FIG. 13C illustrates another example user interface for a function that enables receiving persistent response to a survey question.
Figure 13B:
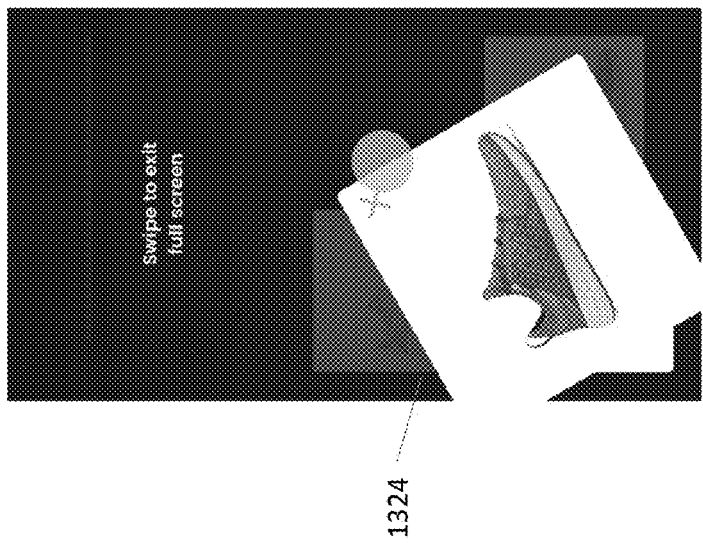
FIG. 13B illustrates another example user interface for a function that enables receiving persistent response to a survey question with response options including response buttons that can be swiped to exit a current screen.
Figure 13A:
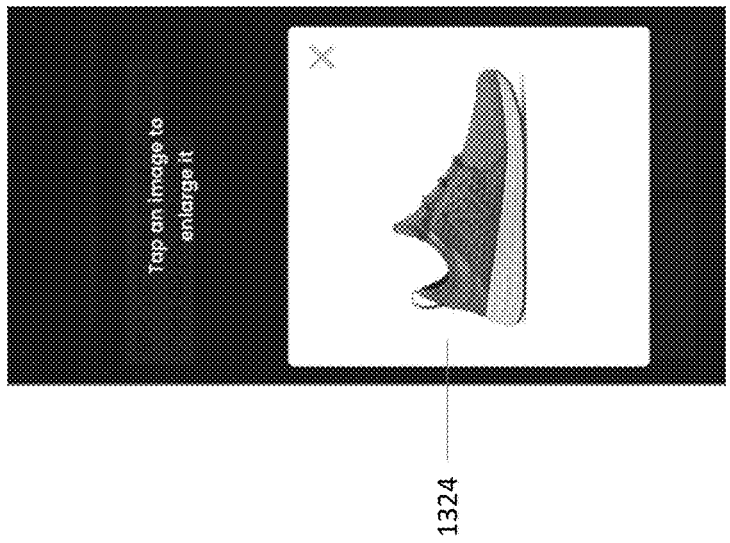
FIG. 13A illustrates another example user interface for a function that enables receiving persistent response to a survey question with response options including response buttons that can be enlarged upon selection of the response button.

FIGS. 13A-13C illustrate example user interfaces that implement the function for receiving persistent response to survey questions, in accordance with some implementations. In FIG. 13A, the respondent has already decided response option 1324 as the response to a question (not shown in FIGS. 13A-13C). As shown in FIG. 13A, the respondent can enlarge the response button that is associated with response option 1324. If the respondent changes their mind about this response option as a response to the question, as shown in FIG. 13B, the respondent can swipe the response button that is associated with response option 1324 to exit the enlarged image of the response button and go back to the previous view. However, if the respondent decides to choose response option 1324, then the respondent can press and hold the response button associated with this response option for a specific time duration.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method for conducting an online survey with a respondent to obtain a persistent selection of a first response element or a second response element of a set of response elements from the respondent and to provide sensory feedback to the respondent, while the respondent engages with the first response element or the second response element, on a status of completion of the selection of the first response element or the second response element, the method comprising:
presenting an interface associated with the online survey on a touchscreen of a respondent device, the interface displaying, to the respondent, a question of the online survey and the set of response elements, each response element associated with a different response to the question, the first response element being associated with a first predetermined duration and the second response element being associated with a second predetermined duration different from the first predetermined duration;
receiving, via the touchscreen, a touch input from the respondent at a portion of the touchscreen displaying the first response element or the second response element;
when the portion of the touchscreen is displaying the first response element:
while receiving the touch input via the touchscreen, presenting the sensory feedback to the respondent based on an elapsed duration of the receiving the touch input, up until the first predetermined duration;
in response to receiving the touch input at the first response element for the first predetermined duration, deeming the first response element as a persistent selection by the respondent and the response associated with the first response element as the respondent's response to the question; and
transmitting an indication of the first response element to a remote device as the respondent's selection of a response associated with the first response element to the question; and when the portion of the touchscreen is displaying the second response element:
while receiving the touch input via the touchscreen, presenting the sensory feedback to the respondent based on an elapsed duration of the receiving the touch input, up until the second predetermined duration;
in response to receiving the touch input at the second response element for the second predetermined duration, deeming the second response element as a persistent selection by the respondent and the response associated with the second response element as the respondent's response to the question; and
transmitting an indication of the second response element to the remote device as the respondent's selection of a response associated with the second response element to the question.

2. The method of claim 1, wherein the first response element is a text box displaying text to the respondent and the presenting the sensory feedback includes superimposing a progress bar over the text box from a first end of the text box to a second end of the text box over the course of the first predetermined duration,
wherein the progress bar is translucent to permit the respondent to continue to view the text box.

3. The method of claim 2, wherein a color of the progress bar is different from a background color of the text box.

4. The method of claim 2, wherein at least a portion of a boundary of the progress bar overlaps with a boundary of the text box.

5. The method of claim 1, wherein the first response element is an image and the presenting the sensory feedback including superimposing a progress bar over the image from a first end of the image to a second end of the image over the course of the first predetermined duration.

6. The method of claim 5, wherein at least a portion of a boundary of the progress bar overlaps with a boundary of the image.

7. The method of claim 5, further comprising, upon receiving the touch input and before presenting the sensory feedback, enlarging the display of the first response element on the screen of the respondent device.

8. The method of claim 1, wherein the first response element is an image and the presenting the sensory feedback includes displaying a progress bar, such that the image appears superimposed over the progress bar, from outside a first end of the image to outside a second end of the image over the course of the first predetermined duration.

9. The method of claim 8, wherein a boundary of the progress bar is outside a boundary of the image.

10. The method of claim 1, wherein the first response element is a video and the presenting the sensory feedback includes superimposing a progress bar over the video from a first end of the video to a second end of the video over the course of the first predetermined duration, wherein the progress bar is translucent or transparent to permit the respondent to continue to view the video.

11. The method of claim 1, further comprising, while continuing to receive the touch input, presenting at least one of audio feedback or haptic feedback to the respondent via the respondent device.

12. The method of claim 1, further comprising:
receiving, from the remote device, a specification of the first and the second predetermined durations.

13. The method of claim 1, wherein the first or the second predetermined duration is about 1.2 seconds.

14. The method of claim 1, further comprising dynamically determining, prior to the deeming the first response element as a persistent selection, the first predetermined duration based on a survey history associated with the user.

15. A non-transitory computer-readable medium (CRM) storing instructions that, when executed by a processor of a respondent device, perform a method for conducting an online survey with a respondent to obtain a persistent selection of a first response element of a set of response elements from the respondent and to provide sensory feedback to the respondent, while the respondent engages with the first response element, on a status of completion of the selection of the first response element after a first predetermined duration, the non-transitory CRM storing instructions for the processor to:
  receive, from a remote device, a specification of an online survey including a set of questions and a set of response elements associated with each question of the set of questions;
  receive, from the remote device, a specification of the first predetermined duration and a specification of a second predetermined duration different from the first predetermined duration, wherein the first response element of the set of response elements is associated with the first predetermined duration and a second response element of the set of response elements is associated with the second predetermined duration;
  for each question of the set of questions:
    generate an interface including that question and its corresponding set of response elements;
    present the interface associated with the online survey on a touchscreen of the respondent device, the interface displaying, to the respondent, the question and the set of response elements;
    receive, via the touchscreen, a touch input from the respondent at a portion of the touchscreen as a selection of the first response element or the second response element, the portion of the touchscreen associated with the first response element or the second response element;
    when the portion of the touchscreen is associated with the first response element:
      while receiving the touch input via the touchscreen, present the sensory feedback to the respondent based on an elapsed duration of the receiving the touch input, up till the first predetermined duration;
      in response to receiving the touch input at the first response element for the first predetermined duration, deem the first response element as a persistent selection by the respondent; and
      transmit an indication of the first response element to the remote device as the respondent's selection of a response associated with the first response element to the question; and
    when the portion of the touchscreen is associated with the second response element:
      while receiving the touch input via the touchscreen, present the sensory feedback to the respondent based on an elapsed duration of the receiving the touch input, up till the second predetermined duration;
      in response to receiving the touch input at the second response element for the second predetermined duration, deem the second response element as a persistent selection by the respondent; and
      transmit an indication of the second response element to the remote device as the respondent's selection of a response associated with the second response element to the question.

16. The non-transitory CRM of claim 15, wherein the sensory feedback includes visual feedback and the instructions for the processor to present the sensory feedback to the respondent further include instructions for the processor to present the visual feedback to the respondent by, when the portion of the touchscreen is associated with the first response element, continuously or intermittently modifying the display of the first response element on the screen over the course of the first predetermined duration.

17. The non-transitory CRM of claim 15, when the portion of the touchscreen is associated with the first response element, wherein the sensory feedback includes audio feedback and the instructions for the processor to present the sensory feedback to the respondent further include instructions for the processor to present the audio feedback to the respondent by one or more of:
  modulating an audio signal played by a speaker of the respondent device over the course of the first predetermined duration;
  playing an audio signal upon initial receipt of the touch input; or
  playing an audio signal when the touch input is received for the first predetermined duration.

18. The non-transitory CRM of claim 15, when the portion of the touchscreen is associated with the first response element, wherein the sensory feedback includes haptic feedback and the instructions for the processor to present the sensory feedback to the respondent further include instructions for the processor to present the haptic feedback to the respondent by one or more of:
  modulating a haptic signal generated by an actuator of the respondent device over the course of the first predetermined duration;
  generating a haptic signal upon initial receipt of the touch input; or
  generating a haptic signal when the touch input is received for the first predetermined duration.

19. The non-transitory CRM of claim 15, wherein the instructions for the processor to display the set of response elements further include instructions for the processor to:
  display the first response element of the set of response elements at a first size; and
  display the second response element of the set of response elements at a second size different from the first size.

20. A system for conducting an online survey with a respondent to obtain a persistent selection of a first response element or a second response element of a set of response elements from the respondent and to provide sensory feedback to the respondent, while the respondent engages with the first response element or the second response element, on a status of completion of the selection of the first response element or the second response element, the system comprising:
  a remote server, the remote server including a database to store a specification of a first predetermined duration and a second predetermined duration different from the first predetermined duration associated with an online survey including a set of questions and the set of response elements associated with each question of the set of questions, the first response element being associated with the first predetermined duration and the second response element being associated with the second predetermined duration; and a computing device communicably coupled to the remote server, the computing device including:
a network interface;
a processor; and
a touchscreen display, wherein the processor, the network interface, and the touchscreen display are collectively configured to execute computer-executable instructions to:
receive the specification of the first predetermined duration and the second predetermined duration from the remote server;
render the online survey on the touchscreen display;
receive, via the touchscreen display, a touch input from the respondent at a portion of the touchscreen display that is displaying the first response element or the second response element;
when the portion of the touchscreen is displaying the first response element:
while receiving the touch input via the touchscreen, present the sensory feedback to the respondent based on an elapsed duration of the receiving the touch input, up until the first predetermined duration;
in response to receiving the touch input at the first response element for the first predetermined duration, deem the first response element as a persistent selection by the respondent and the response associated with the first response element as a persistent selection by the respondent to the question; and
transmit an indication of the first response element to the remote server as the respondent's selection of a response associated with the first response element to the question; and when the portion of the touchscreen is displaying the second response element:
while receiving the touch input via the touchscreen, present the sensory feedback to the respondent based on an elapsed duration of the receiving the touch input, up until the second predetermined duration;
in response to receiving the touch input at the second response element for the second predetermined duration, deem the second response element as a persistent selection by the respondent and the response associated with the second response element as a persistent selection by the respondent to the question; and
transmit an indication of the second response element to the remote server as the respondent's selection of a response associated with the second response element to the question.

21. The system of claim 20, wherein the processor is a first processor, and wherein the remote server further includes a second processor to:
update the database, and
update the first predetermined duration or the second predetermined duration based on the update to the database.

22. The system of claim 21, wherein the second processor is configured to transmit the updated first predetermined duration and to transmit the updated second predetermined duration to the computing device.

23. The system of claim 22, wherein the network interface, the first processor and the touchscreen display are collectively configured to deem the first response element as a persistent selection by the respondent after the touch input is received for the updated first predetermined duration.

* * * * *